March 29, 1927.
A. L. FOSTER
1,622,998
LAWN EDGER
Filed July 28, 1926
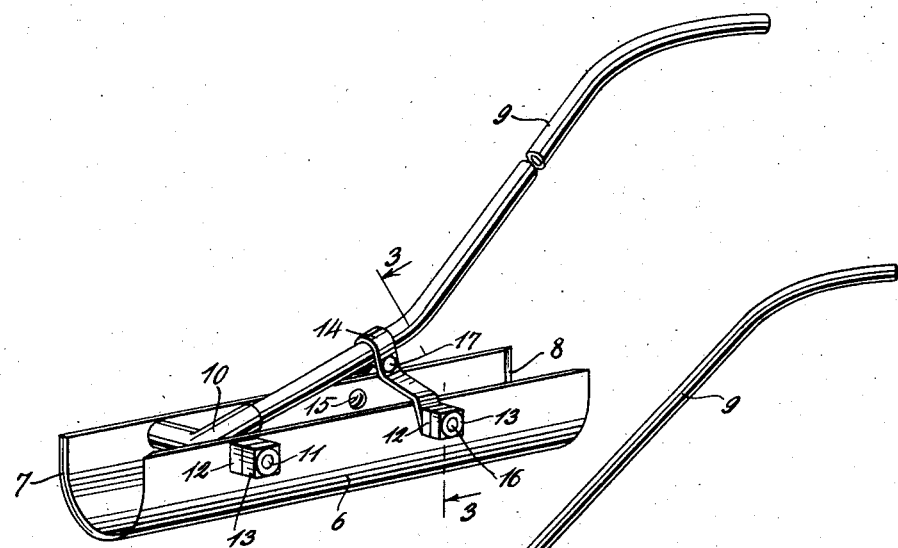
Fig. 1.
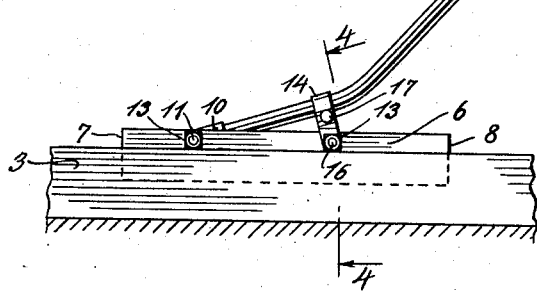
Fig. 2.
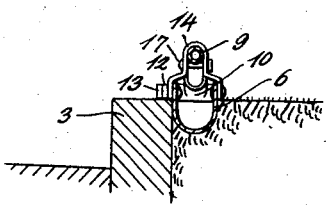
Fig. 3.
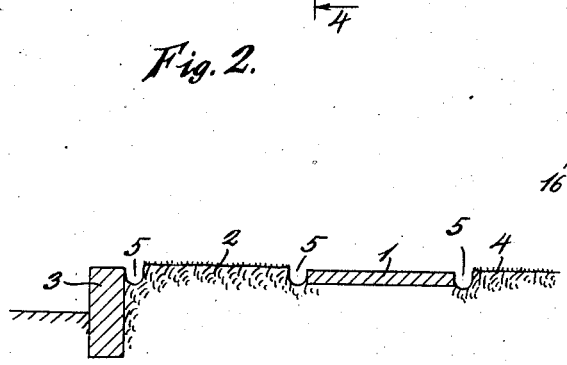
Fig. 5.
Fig. 4.
Inventor
Ashford L. Foster.
By
Attorney Patented Mar. 29, 1927.

1,622,998

UNITED STATES PATENT OFFICE.

ASHFORD L. FOSTER, OF DENVER, COLORADO.

LAWN EDGER.

Application filed July 28, 1926. Serial No. 125,362.

This invention relates to improvements in lawn edgers.

It is well known to all those who have had experience in maintaining a neat appearance of their lawns that it is very difficult to properly mow or trim the grass along the edges of the sidewalks and along the curbing. This is due to several reasons one of which is that the lawn usually rises above the surface of the sidewalk and therefore the lawn mower will not do neat work. It therefore becomes necessary to resort to some special means for trimming the lawn along these places. It is customary to employ a spade or some similar tool for the purpose of making a gutter along the edges of the sidewalk and the curb. This, however, is a very laborious and awkward means for performing this operation.

It is the object of this invention to produce a simple tool that can be cheaply constructed and which shall be well adapted for making gutters along the sidewalk and curbing. These gutters in addition to improving the appearance of the lawn and allowing the lawn mower to do a better and neater job, also permit the water from heavy rains and from sprinkling to run off the grass and to sink into the ground where it will produce a subirrigation which greatly improves the grass. Besides this, the gutters also make it easier to clean the snow from the sidewalk during the winter time, as it makes it possible to remove the snow from the entire width of the sidewalk.

My invention can be best described and will be most readily understood when reference is had to the accompanying drawing in which the preferred embodiment thereof has been illustrated and in which:

Fig. 1 is a perspective view of my improved edging tool;

Figure 2 is a side elevation showing the tool in place along the edge of the curb;

Figure 3 is a section taken on line 3—3, Figure 2;

Figure 4 is a section taken on line 4—4, Figure 1; and

Figure 5 is a transverse section through the curbing, the parking and the sidewalk and shows the relationship of the gutters to these parts.

In the drawing numeral 1 represents the sidewalk 2 the parking and numeral 3 is the curbing, while the lawn is represented by numeral 4. In Figure 5 I have shown a gutter, which has been indicated by numeral 5, extending along the edge of the curbing and along the two edges of the sidewalk.

The tool by which these gutters are produced has been shown in perspective in Figure 1 and consists of an elongated cutter member or blade 6 which is formed from sheet steel bent into a U-shaped cross section such as illustrated in Figure 4. This cutter has a length of about fourteen inches, a depth of two inches and is preferably about two inches wide at the top. The two ends which have been represented by numerals 7 and 8 are sharpened so as to form cutting edges. Secured to this cutting blade is a handle 9 which may be made from gas piping and which is secured to the cutter by the following means. An ordinary T connector 10 is threaded to the lower end of the pipe and extends transversely of the cutter between the vertical sides thereof. A bolt 11 extends through the sides of the cutter and through the transverse portion of the T. A nut 12 and a lock nut 13 are secured to the threaded end of the bolt. These nuts extend out beyond the outer surface of the cutter and form guides which engage the upper surface of the curbing or sidewalk and limit the depth to which the cutters can sink into the ground, in the manner indicated in Figure 3. In order to provide sufficient space for the ground to accumulate in the cutter the handle has been extended upwardly at an angle and is held to the cutter by means of a strap 14 whose ends are secured to the sides of the cutter by screws or rivets 15 and by means of a bolt 16 having two nuts similar to those indicated by numerals 12 and 13. As these two sets of nuts are spaced some distance apart, they hold the cutter in parallel relation to the upper surface of the sidewalk or the curbing. The clamping screw 17 extends between the opposite sides of the strap 14 directly beneath the handle 9 (see Fig. 4) and serves to clamp the strap rigidly about the handle.

Let us now assume that the tool has been assembled in the manner described and that it is desired to form trenches along the curbing. The tool is placed in position in the manner shown in Figures 2 and 3, after which it is drawn in the direction of arrow X. The cutting edge 8 will cut a semi-circular core of dirt and when the cutter is filled, it is removed and emptied after which another section of dirt can be cut.

After the gutters have been cut, they can be kept open with a very small amount of labor by merely going over them at short intervals and removing any dirt that may have accumulated.

Although the tool has been described for use in connection with the edging of lawns and parkings, it is evident that it may also be employed for other purposes such, for example, as making irrigation ditches in gardens and for cutting furrows for planting seeds. It may also possibly be useful for many other purposes although the ones enumerated are considered to be the most important uses.

From the above description it may be apparent that I have produced a simple and inexpensive tool that is especially well adapted for the purpose for which it is intended.

Having now described the invention what is claimed as new is:

A device of the class described comprising an elongated cutting member formed from sheet metal and having a U-shaped transverse section, a handle having a T secured to one end thereof, a bolt extending through the sides of said cutting member and through the T, a strap having its ends secured to the sides of said cutting member and having its central portion enclosing a part of said handle and a bolt connecting opposite sides of said strap so as to form a loop through which the handle extends whereby the strap may be securely clamped to the handle.

In testimony whereof I affix my signature.

ASHFORD L. FOSTER.